United States Patent [19]
Cidon et al.

[11] Patent Number: 5,367,517
[45] Date of Patent: Nov. 22, 1994

[54] METHOD AND SYSTEM OF REQUESTING RESOURCES IN A PACKET-SWITCHED NETWORK WITH MINIMAL LATENCY

[75] Inventors: Israel Cidon, Haifa, Israel; Inder S. Gopal, New York; Roch A. Guerin, Yorktown Heights, both of N.Y.

[73] Assignee: International Business Machines Corporation, Armonk, N.Y.

[21] Appl. No.: 992,277

[22] Filed: Dec. 16, 1992

[51] Int. Cl.⁵ ............................................. H04L 12/56
[52] U.S. Cl. ........................................ 370/54; 370/60; 370/79; 370/85.8; 370/94.1
[58] Field of Search ..................... 370/60, 60.1, 79, 82, 370/83, 84, 94.1, 94.2, 95.1, 858.8, 54; 340/826

[56] References Cited

U.S. PATENT DOCUMENTS

| | | | |
|---|---|---|---|
| 5,029,164 | 7/1991 | Goldstein et al. | 370/79 |
| 5,130,982 | 7/1992 | Ash et al. | 370/60 |
| 5,185,737 | 2/1993 | Nassehi et al. | 370/85.8 |

*Primary Examiner*—Benedict V. Safourek
*Attorney, Agent, or Firm*—Ratner & Prestia

[57] ABSTRACT

A fast bandwidth reservation method and system used in packet-switched networks that reserve bandwidth for a data transfer over links in a path between a source node, at least one intermediate node, and a destination node with minimal latency where the source node desires to send data to the destination node along the specific path using at least a minimum bandwidth and up to a maximum bandwidth. The goal of the method and system is to reserve bandwidth for a data transfer in the minimal amount of time. No link on the path between the source node and destination node has more bandwidth allocated for the source node than the minimum allocated for the previous forward links on the path. Links on the path between the source node and destination node have their bandwidth allocation for the data transfer adjusted based on the final minimum bandwidth allocated for the data transfer.

11 Claims, 7 Drawing Sheets

FIG. 3A | 5 | 12 | 16 | AA | $$ | BW_REQ | B_max=B_θ | B_min=B_θ/3 |

FIG. 3B | 12 | 16 | AA | $$ | BB | $$ | BW_REQ | B_max=B_θ | B_min=B_θ/3 | B(0)=B_θ |

FIG. 3C | 16 | AA | $$ | 21 | BB | $$ | BW_REQ | B_max=B_θ | B_min=B_θ/3 | B(0)=B_θ | B(1)=B_θ |

FIG. 3D | AA | $$ | 2 | 21 | BB | $$ | BW_REQ | B_max=B_θ/2 | B_min=B_θ/3 | B(2)=B_θ/2 | B(1)=B_θ | B(0)=B_θ |

FIG. 3E | 11 | 2 | 21 | BB | $$ | BW_REQ | B_max=B_θ/2 | B_min=B_θ/3 | B(2)=B_θ/2 | B(1)=B_θ | B(0)=B_θ |

FIG. 3F | 2 | 21 | BB | $$ | AA | $$ | BW_RPL | B_max=B_θ/2 | B_min=B_θ/3 | B(2)=B_θ/2 | B(1)=B_θ | B(0)=B_θ |

FIG. 3G | 21 | BB | $$ | 16 | AA | $$ | BW_RPL | B_max=B_θ/2 | B_min=B_θ/3 | B(1)=B_θ | B(0)=B_θ |

FIG. 3H | BB | $$ | 12 | 16 | AA | $$ | BW_RPL | B_max=B_θ/2 | B_min=B_θ/3 | B(0)=B_θ |

FIG. 3I | 5 | 12 | 16 | AA | $$ | BW_RPL | B_max=B_θ/2 | B_min=B_θ/3 |

METHOD AND SYSTEM OF REQUESTING RESOURCES IN A PACKET-SWITCHED NETWORK WITH MINIMAL LATENCY

The present invention is embodied in packet-switched networks which reserve bandwidth, specifically, in packet-switched networks that have the ability to reserve bandwidth along a path between a source node and a destination node.

BACKGROUND OF THE INVENTION

A fast reservation mechanism which has the ability to allocate bandwidth within a short period of time is desirable in fast packet-switched networks with high-speed bursty connections. In these networks, the high-speed bursty connections alternate between periods requiring a bandwidth allocation at peak and no bandwidth. In networks employing a static bandwidth allocation technique, as the alternating periods increase, the static bandwidth allocation technique becomes less efficient because the high-speed bursty connections generally require a bandwidth allocation close to their peak rate irrespective of how often they actually need it.

To resolve the bandwidth allocation problems associated with high-speed bursty connections, bandwidth reservation protocols have been presented. One bandwidth reservation protocol is described in U.S. Pat. No. 5,081,620 by Girard et al which is hereby incorporated by reference. This bandwidth reservation protocol sends a call packet containing a desired bit rate (DEB) from a source node to the destination node where the source node desires to send data at the desired bit rate to the destination node.

In the preferred embodiment described by Girard, each switching node between the source and destination node receives the call packet and adds the value of the DEB to an appropriate reserved bit rate register in the switching node. The reserved bit rate register indicates the total bit rate reserved in the switching node for data flowing in the same direction in the switching node as the call packet.

If the value of the register is greater than a maximum disposable bit rate (DBmax) of the switching node, a bit in the call packet, the R/E bit, is changed to zero, otherwise the value of the R/E bit packet is not changed. Then, regardless of whether the DBmax value was exceeded in the switching node, the call packet is sent to the next switching node where the DEB is again added to the appropriate reserved bit rate register and then compared to the DBmax of this switching node.

When the call packet reaches the destination node, the R/E bit is evaluated. If the R/E bit is not set to zero, indicating no switching node in the path from the source to the destination node exceeded its DBmax upon the addition of DEB to its current reserved bit rate, a call packet is sent back to the source node from the destination node indicating that the DEB has been reserved and the source node may transmit data to the destination node along the path at the DEB.

When each switching node between the source and destination node can support the DEB of the source node, this reservation protocol reserves the bit rate in a time period approximately equal to the round trip propagation of the call packet. The reservation protocol, however, fails to address the ramifications of its protocol when one or more switching nodes cannot support the DEB of the source node. In addition, this reservation protocol does not support source nodes that while preferably desiring some maximum bit rate or bandwidth can still function with a bandwidth lower than the desired maximum bandwidth down to some minimally acceptable bandwidth.

SUMMARY OF THE INVENTION

The present invention is a system and method for requesting resources in a communications network with minimal latency by transmitting a request packet in a path from a source node through at least one intermediate node towards a destination node, said nodes coupled by respective links.

According to one aspect of the invention, no link on the path between the source node and destination node allocates more bandwidth for this request for resources for the source node than the amount allocated for the previous links on the path.

According to another aspect of the invention, links on the path between the source node and destination node have their bandwidth allocation adjusted for this request for resources for the source node based on the final bandwidth allocated for this request by all the links in the path.

DETAILED DESCRIPTION OF THE EXEMPLARY EMBODIMENTS

Overview

Figure 1:
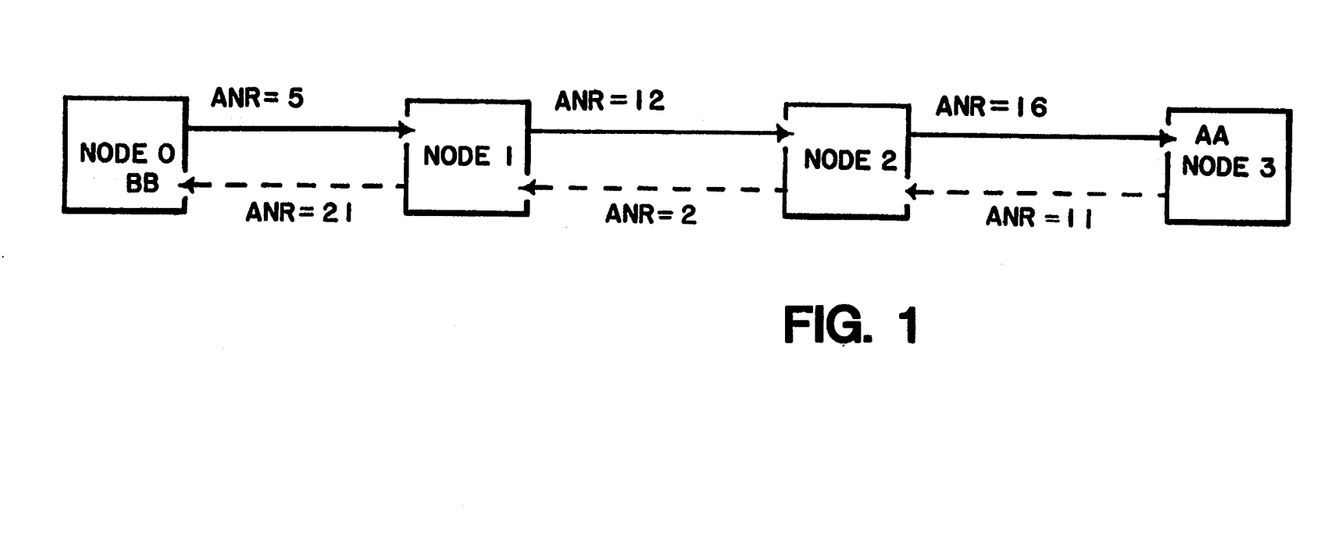
FIG. 1 is a block diagram of an exemplary data path using Automatic Network Routing (ANR).

An exemplary data path using Automatic Network Routing (ANR) is shown in FIG. 1. A brief overview of the invention is presented by reference to this exemplary data path. In this example, Node 0 desires to send data to Node 3 at a minimum data rate requiring a minimum bandwidth allocation, B_min, and optimally at a desired maximum data rate, requiring a maximum bandwidth allocation, B_max. Note that B_min may equal B_max. In this example, the data path from Node 0, the source node, to Node 3, the destination node, is through two intermediate nodes, namely Nodes 1 and 2. The present invention is directed to a path having at least one intermediate node. In the exemplary embodiment of the invention, a reservation request packet is generated by the source node, Node 0, that indicates the minimum bandwidth allocation, B_min, and the desired maximum bandwidth allocation, B_max. The reservation request packet is processed by bandwidth allocation devices in the path. A bandwidth allocation device uses the current bandwidth allocation and request for resources in the request packet to determine whether to reserve bandwidth for this request for resources.

Figure 2A:
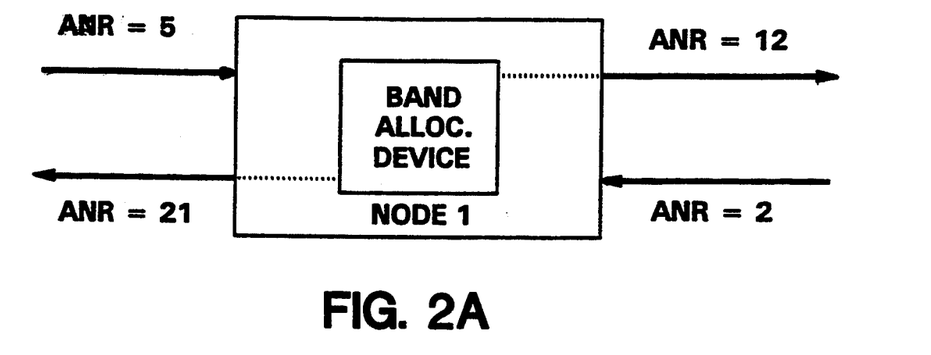
FIGS. 2A–2C are block diagrams of Node 1 shown in FIG. 1 which depict two different exemplary configurations of the bandwidth allocation devices.
Figure 2B:
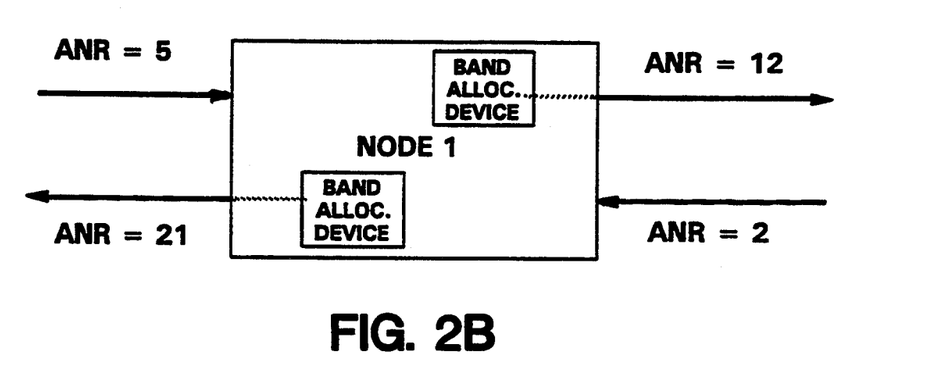
Figure 2C:
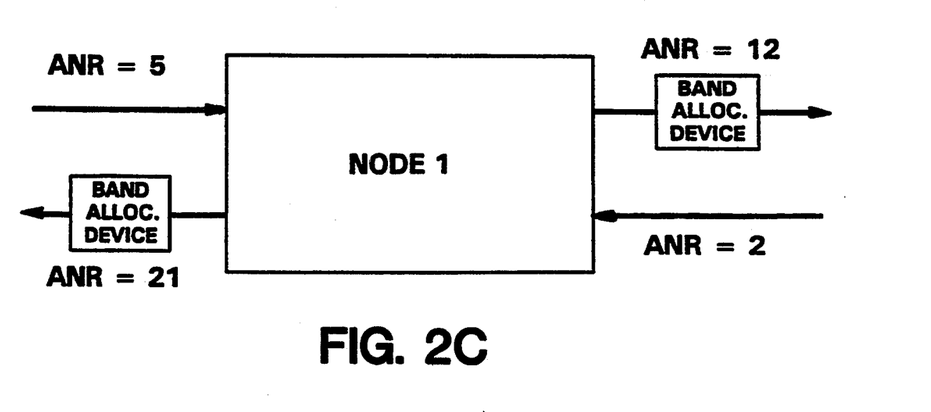

Two exemplary configurations of bandwidth allocation devices are shown in FIG. 2. FIGS. 2A to 2B illustrate Node 1 shown in FIG. 1 with exemplary bandwidth allocation device configurations. FIG. 2A illustrates an exemplary configuration where the node has a single bandwidth allocation device which processes request packets which desire to reserve bandwidth on either of the outgoing links attached to Node 1, ANR link 12 and ANR link 21.

FIG. 2B illustrates an exemplary configuration where each outgoing link has a separate bandwidth allocation device (BAD). Outgoing ANR link 21 and ANR link 12 each has a BAD which processes request packets which desire to reserve bandwidth on the respective outgoing link. In addition, the BADs receive and process reply packets from the incoming ANR link 5 and ANR link 2. The BADs use the information in the reply packets to update the current bandwidth allocation for the outgoing links as appropriate.

In the exemplary data path shown in FIG. 1, the BAD configuration shown in FIG. 2B is employed. Thus, when the request packet is sent out of Node 0, the BAD for outgoing ANR link 5 (not shown) receives and processes the request packet. The BAD determines whether outgoing ANR link 5, from Node 0 to Node 1 can support a bandwidth between $B\_max$ and $B\_min$ based on the current reserved bandwidth allocation on this link. If this link can support a bandwidth greater than or equal to $B\_max$, the BAD increases the reserved bandwidth allocation for ANR link 5 by $B\_max$ and the request packet is sent to Node 1. The BAD for outgoing ANR link 5 increases the reserved bandwidth allocation for this link by $B\_max$ so that it reflects the total bandwidth ANR link 5 has reserved for data flow.

If ANR link 5 can support a bandwidth greater than or equal to $B\_min$ but less than $B\_max$, for example, $B\_maxn1$ where $B\_max > B\_maxn1 > B\_min$, then the BAD replaces $B\_max$ in the reservation request packet with $B\_maxn1$, increases the reserved bandwidth allocation for ANR link 5 by $B\_maxn1$ and passes the reservation request packet to forward on the path. The BAD for outgoing ANR link 5 replaces $B\_max$ in the reservation request packet with $B\_maxn1$ so that future links on the path do not reserve more bandwidth than previous links on the network.

In the preferred embodiment of the invention if ANR link 5 can not support a bandwidth greater than or equal to $B\_min$, the BAD replaces $B\_max$ in the request packet with 0, changes the packet type to reply, and sends the reservation request reply packet backwards in the data path, in this example to Node 0. This prevents forward links on the data path from unnecessarily allocating bandwidth for this data transfer request. By immediately sending the reservation request packet back to the source node along the data path when a link can not support at least $B\_min$, each previous link on the data path can immediately de-allocate the bandwidth reserved by a BAD for this data transfer request thus freeing the bandwidth for other requests.

In addition, the source node will receive the reservation request packet indicating failure quicker. This may enable the source node to specify a different data path to reach the destination node depending on the network configuration or to lower its minimum acceptable bandwidth $B\_min$, if possible, sooner than if the reservation request proceeded forward on the data path until the reservation request packet reached the destination node.

In another embodiment of the invention, after the desired request for resources in the request packet has been set to zero, the request packet is sent forward in the data path until the request packet is received by a device which can send the request packet backwards on the data path. This embodiment still prevents other BADs in the path from unnecessarily allocating bandwidth for this request since the desired request for resources is set to zero in the request packet.

If, however, ANR link 5 was able to support at least $B\_min$, the request packet will pass through Node 1 and will be received by the BAD for outgoing ANR link 12 with a non-zero bandwidth request. The BAD for outgoing ANR link 12 will perform the same process as described for the BAD for outgoing ANR link 5. If ANR link 12 can not support $B\_min$, the BAD for outgoing ANR link 12 will set $B\_max$ to 0 in the request packet and in the preferred embodiment, the BAD for outgoing ANR link 12 will also change the packet type to reply and send the reservation request reply packet backward in the data path. If ANR link 12 can support at least $B\_min$, the BAD will update the reservation request packet as appropriate and send the reservation forward in the data path.

The BAD for outgoing ANR link 16 (not shown), the link coupled to the destination node in this example, will receive the reservation request packet and also determine whether ANR link 16 can support at least $B\_min$ and update $B\_max$ in the reservation request packet as appropriate. In the preferred embodiment of the invention, if this link cannot support $B\_min$, the BAD will set $B\_max$ to 0 in the reservation request packet, change the packet type to reply and send the reservation request reply packet backwards on the data path. In the second preferred embodiment of this invention, the BAD may not be able to send the reservation request reply packet backwards on the data path and thus the data packet will be received by Node 3, the destination node.

If, however, this link can support at least $B\_min$, the BAD will send the request packet forward on the data path to Node 3. Node 3, the destination node, will receive the request packet and may transmit the request packet to a destination device (not shown). Node 3 or the destination device will change the packet type to reply and sent the reservation request reply packet backwards on the data path. Node 3 or the destination device may also set $B\_max$ to 0 if it is not able to support at least $B\_min$.

As each BAD for the outgoing links on the forward data path receives the reservation request reply packet on its path back to the source node, the BAD will evaluate the final value of $B\_max$ in the reservation request packet and the bandwidth it allocated for this data transfer request. In one embodiment of the invention the BAD may have a look-up table (LUT) where it stores the value of the bandwidth allocation for each request. In this case the request packet would contain a unique identifier used in the LUTs.

In the preferred embodiment of this invention, the information is included in the reservation request packet. Regardless, if the current value of $B\_max$ in the request packet is less than the amount reserved by the BAD for this data transfer request, the BAD will subtract the difference from the bandwidth reservation allocation for the appropriate outgoing link. Each BAD for the outgoing links on the forward data path performs this operation so that no outgoing link on the forward data path allocates more bandwidth for this data transfer request than any other outgoing link on the forward data path.

As noted above, in the preferred embodiment of this invention if any outgoing link on the forward data path can not allocate at least $B\_min$, the BAD for the outgoing link sets $B\_max$ to 0 in the reservation request packet, changes the packet type to reply and sends the reservation request reply packet backwards in the data path. Each BAD for the outgoing links on the forward data path receiving the reservation request reply packet will, as described above, then subtract the amount of bandwidth it allocated for this data transfer request from the bandwidth reservation allocation for the appropriate link since a link on the forward data path can not support at least $B\_min$, and thus the source node will not be able to transmit data for this request.

The source node will receive the modified reservation request reply packet after all the BADs for the outgoing links on the forward data path have adjusted their bandwidth reservation allocation as appropriate. In the preferred embodiment of the invention, the source node may receive that modified reservation request reply packet after a BAD for a link in the data path which was not able to allocate at least $B\_min$, changed the packet type to reply and sent the reservation request reply packet back to the source node. Upon receipt of the reservation request reply packet, the source node will then be able to transmit data at the rate indicated by $B\_max$ in the reservation request reply packet for this request. $B\_max$ will either be zero, indicating that the source node can not at this time transmit its data to the destination node along this specific data path for this request, or range from $B\_min$ to the desired maximum bandwidth.

The total time period required to reserve and adjust the bandwidth and notify the source node for a source node request is approximately equal to the round trip propagation delay of the network and the processing time in each BAD for outgoing links in the forward data path. The processing time in each BAD may be relatively small since the operations performed in each BAD are relatively simple and thus may be implemented in hardware.

Detailed Description

A detailed example using the preferred embodiment of this invention is presented by reference to FIGS. 1, 2B and FIGS. 3A to 3I. An example of an exemplary network configuration employing third different data paths which may reserve bandwidth according to this invention is presented by reference to FIGS. 4 to 6.

As described above, FIG. 1 is a block diagram of an exemplary data path which uses ANR. In this data path Node 0 is the source node and Node 3 is the destination node. Node 0 receives data from an attached device (not shown) whose address is BB. Node 3 transmits data to an attached device (not shown) whose address is AA.

FIG. 2B is a block diagram of the configuration of the bandwidth allocation devices (BAD)s used in the preferred embodiment of this invention. As shown in FIG. 2B each outgoing link for a node has its own BAD, in this example, ANR link 21 and ANR link 12 each has its own BAD.

FIGS. 3A to 3E list the information in the reservation request packet for a specific example as the reservation request packet is passed from Node 0 to Node 3 in the exemplary data path. FIGS. 3F to 3I list the information in the reservation request reply packet as the reservation request reply packet is sent back to Node 0 from Node 3.

In this specific example, a device attached to Node 0 (not shown) wants to send data to a device attached to Node 3 (not shown) using a minimum bandwidth of $B\_0/3$, $B\_min = B\_0/3$, and optimally using the maximum bandwidth of $B\_0$, $B\_max = B\_0$. The exemplary embodiment uses ANR with reverse path accumulation so that Node 0 generates a request packet which lists the forward ANR links to the destination node and as the request packet is passed to each node in the path from the source node to the destination node, the ANR link from the current node to the previous node will be added to the reservation request packet so the reservation request packet can be routed back to the source node.

In this example, to route the reservation request packet from the source node to the destination node, ANR links 5, 12, and 16 are used in the forward path. The source node has determined these links from another process and includes this information along with the $B\_min$ and $B\_max$ values in the reservation request packet. In this example, ANR link 5 and ANR link 12 can support additional bandwidth of at least $B\_0$ and ANR link 16 can support additional bandwidth of only $B\_0/2$.

Figure 3A:
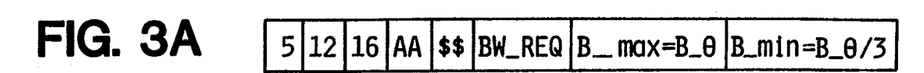
FIGS. 3A to 3I are listings of exemplary packet information used in the exemplary data path shown in FIG. 1.

FIG. 3A lists an example of such a reservation request packet for this example. As shown in FIG. 3A, the first three elements of the packet indicate the ANR links from the source node, Node 0, to the destination node, Node 3. The fourth element is the address of the device attached to this node (not shown) which is to receive the data, the destination address AA. The fifth element indicates the end of the ANR routing information in the packet. The sixth element of the packet indicates the data type of the packet. In this example, the sixth element is set equal to BW_REQ, which indicates this packet is a reservation request packet.

The seventh element of this packet is the $B\_max$ of the packet which is currently set to the desired maximum bandwidth of the source node, $B\_0$. The eighth element of the packet is $B\_min$, the minimum bandwidth acceptable by the source node which is equal to $B\_0/3$. FIG. 3A lists the information contained in the reservation request packet as it is created in Node 0.

Figure 3B:
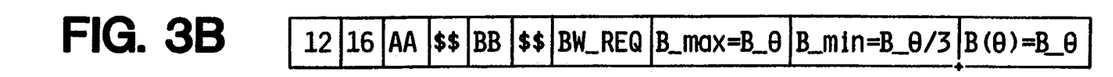

FIG. 3B represents the information contained in the reservation request packet after it is processed by the BAD for outgoing ANR link 5. The first element of the reservation request packet indicating ANR link 5 has been removed from the packet and the address of the sending device attached Node 0 (not shown), BB, has been added after the end of the ANR routing information indicator $$ for the forward path along with another end of the ANR routing information indicator $$ for the return path.

As stated above, in this example ANR link 5 for Node 0 was able to support at least $B\_0$ of additional bandwidth. Accordingly, the reserved bandwidth allocation for ANR link 5 is increased by the value $B\_0$ which is equal to desired maximum bandwidth, and $B\_max$ in the reservation request packet is not changed. In this example, the bandwidth allocated by each outgoing ANR link in the forward data path is appended to the end of the reservation request packet and thus the value B(0)=B_0 is stored in the last element of the reservation request packet. This information is used in the return trip of the reservation request reply packet which is described below.

Figure 3C:
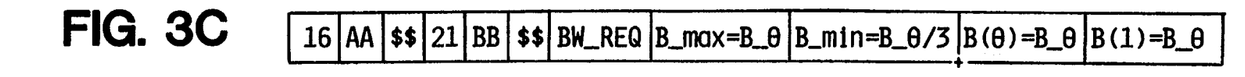

FIG. 3C represents the information contained in the reservation request packet after it is processed by the BAD for outgoing ANR link 12. The first element of the reservation request packet indicating ANR link 12 has been removed from the request packet and the return ANR link 21 has been added after the element containing the end of the ANR routing information indicator $$ for the forward path.

As stated above, in this example ANR link 12 for Node 1 was also able to support at least B_0 of additional bandwidth. Accordingly, the reserved bandwidth allocation for ANR link 12 is increased by B_0, therefore B_max in the reservation request packet is not changed, and the value B(1)=B_0 is stored in an element inserted in the reservation request packet after the element indicating B_min.

Figure 3D:
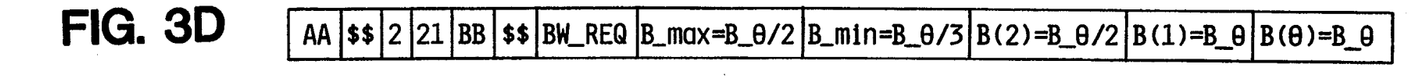

FIG. 3D represents the information contained in the reservation request packet after it is processed by the BAD for outgoing ANR link 16 for Node 2. The first element of the reservation request packet indicating ANR link 16 has been removed from the request packet and the return ANR link 2 has been added after the element containing the end of the ANR routing information indicator $$ for the forward path.

As stated above, in this example ANR link 16 for Node 2 was only able to support B_0/2 of additional bandwidth. Accordingly, the reserved bandwidth allocation for ANR link 16 is increased only by B_0/2. B_max in the reservation request packet is changed to B_0/2 to indicate the current maximum bandwidth supportable by the data path, and the value B(2)=B_0/2 is stored in an element inserted in the reservation request packet after the element indicating B_min.

In the preferred embodiment of this invention if this outgoing ANR link or any other outgoing link on the forward path was not able to support the additional bandwidth of at least B_0/3, which is the value of B_min, then the B_max of the reservation request would have been changed to the value of 0, the type of the packet would have been changed from BW_REQ to BW_RPL, reservation request reply, and the reservation request reply packet would have been sent backwards in the data path to the BADs for the previous outgoing links on the forward data path where the reserved bandwidth allocation for each link would be reduced by the amount each link had reserved for this reservation request.

Figure 3E:
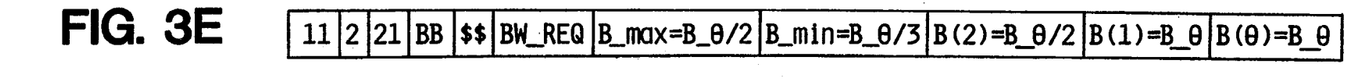

In this example, however, all the outgoing links for the forward path were able to support additional bandwidth of at least B_0/3, the value of B_min, and FIG. 3E represents the information contained in the reservation request packet in Node 3. The first and second elements of the reservation request packet indicating the destination device address AA and the end of the ANR routing information indicator $$ for the forward path have been removed from the reservation request packet and the return ANR link 11 has been inserted to the front of the reservation request packet.

Since Node 3 is attached to the destination device (not shown) as indicated by the destination address AA in this example, the reservation request packet can be sent back to the source node along the same path which the request packet was sent to the destination node. The return path is specified by the first three elements of the reservation request packet, namely ANR links 11, 2, and 21. The destination device or the BAD for the last outgoing link changes the packet type to reply, BW_RPL, indicating that the packet is now a reservation request reply packet and sends the packet to the previous node as indicated by the ANR link contained in the first element of the packet. If the destination device is not able to support at least B_min, it may set B_max to 0 in the reservation request reply packet.

Figure 3F:
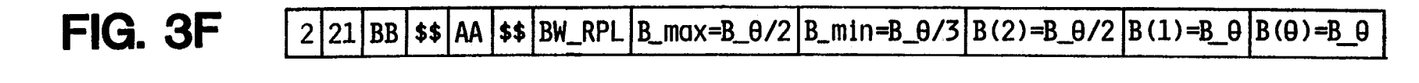

FIG. 3F represents the information contained in the reservation request reply packet in the BAD for outgoing ANR link 16 for Node 2. The first element of the reservation request reply packet indicating ANR link 11 has been removed from the reply packet and the destination device address BB (device attached to the sending node of the reservation request reply packet) has been added after the end of the ANR routing information indicator $$ for the return path along with another end of the ANR routing information indicator $$ for the forward path. In the preferred embodiment of the invention, reverse path accumulation is also performed for return path, however, this is not necessary since Node 0 already knows the forward ANR links between itself and the destination node, Node 3.

As the reservation request reply packet travels on the return path to the source node, each BAD for the outgoing links on the forward data path evaluates the reply packet. The final maximum bandwidth allocated by the outgoing links which is stored in B_max in the reply packet is compared to the bandwidth allocated by the outgoing link. The BAD for outgoing ANR link 16 for Node 2 reserved B_0/2, which is indicated by B(2)=B_0/2 in the element in the reservation request reply packet after the element indicating B_min. Since B_max in the reply packet is equal to B_0/2, no change is made to the reserved bandwidth allocation for outgoing ANR link 16.

Figure 3G:
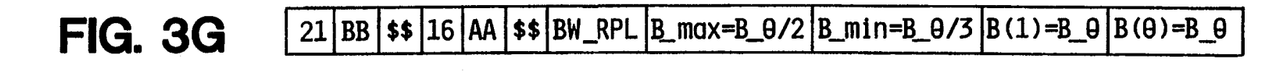

FIG. 3G represents the information contained in the reservation request reply packet in the BAD for outgoing ANR link 12 for Node 1. The first element of the reservation request reply packet indicating ANR link 2 has been removed from the reply packet and the ANR forward link 16 has been added after end of the ANR routing information indicator $$ for the return path. In addition, the element representing the bandwidth allocated for the previous link, B(2) has been removed.

The final maximum bandwidth allocated by the links which is stored in B_max in the reply packet is compared to the bandwidth allocated by the forward link between these two nodes, ANR link 12, in this case the reserved bandwidth B(1)=B_0, which is stored in the element in the reservation request reply packet after the element indicating B_min. In this example, B_max in the reply packet is equal to B_0/2 and thus a reduction of B_0/2, the difference, is made to the reserved bandwidth allocation for outgoing ANR link 12 thereby freeing bandwidth for other requests.

Figure 3H:
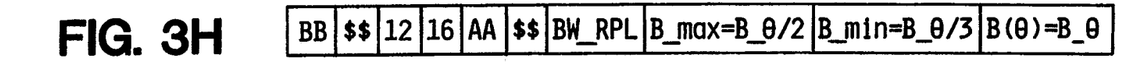

FIG. 3H represents the information contained in the reservation request reply packet in the BAD for outgoing ANR link 5 for Node 0. The first element of the reservation request reply packet indicating ANR link 21 has been removed from the reply packet and the ANR forward link 12 has been added after end of the ANR routing information indicator $$ for the return path. In addition, the element representing the bandwidth allocated for the previous link, B(1) has been removed.

The final maximum bandwidth allocated by the links which is stored in B_max in the reply packet is compared to the bandwidth allocated by the forward link between these two nodes, ANR link 5, in this case the bandwidth B(0)=B_0, which is stored in the element in the reservation request reply packet after the element indicating B_min. In this example, B_max in the reply packet is equal to B_0/2 and thus a reduction of B_0/2, the difference, is made to the reserved bandwidth allocation for ANR link 5 thereby also freeing bandwidth for other requests.

Figure 3I:
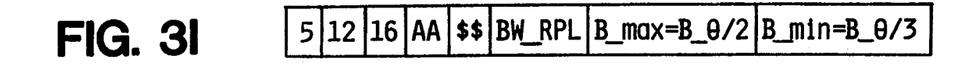

Finally, FIG. 3I represents the information contained in the reservation request reply packet in Node 0. The first and second elements of the reservation request reply packet indicating the device address BB and end of the ANR routing information indicator $$ for the return path have been removed from the reservation request reply packet and the return ANR link 5 has been inserted to the front of the reservation request reply packet. In addition, the element representing the bandwidth allocated for the previous link, B(0) has been removed.

The final maximum bandwidth allocated by the forward links is stored in B_max in the reply packet. Now the device attached to the source node (not shown), Node 0, may start sending data to the device attached to the destination node (not shown), Node 3, along the data path using a bandwidth up to B_max in the reservation request reply packet, in this example, at the rate of B_0/2. As seen from this example, the total time to process the reservation request is equal to the round trip propagation delay for the packet and the processing described above. After the device attached to the source node (not shown) has completed its data transfer, the source node may send a bandwidth release packet to the destination node along the data path to cause each BAD for outgoing links on the forward path to reduce the reserved allocation bandwidth for the outgoing links on the forward path by the amount B_max, in this example equal to B_0/2.

Although this invention is described in terms of ANR mode, it is contemplated that it may be used with other types of routing modes including, for example, label swapping modes and tree routing modes such as described in the article entitled "Network Transparency: The Planet Approach" by Inder Gopal and Roch Guerin and presented at the IEEE INFOCOM '92 "The Conference on Computer Communications" May 6–8, 1992, which is hereby incorporated by reference for its teachings on networks and routing methods.

Figure 4:
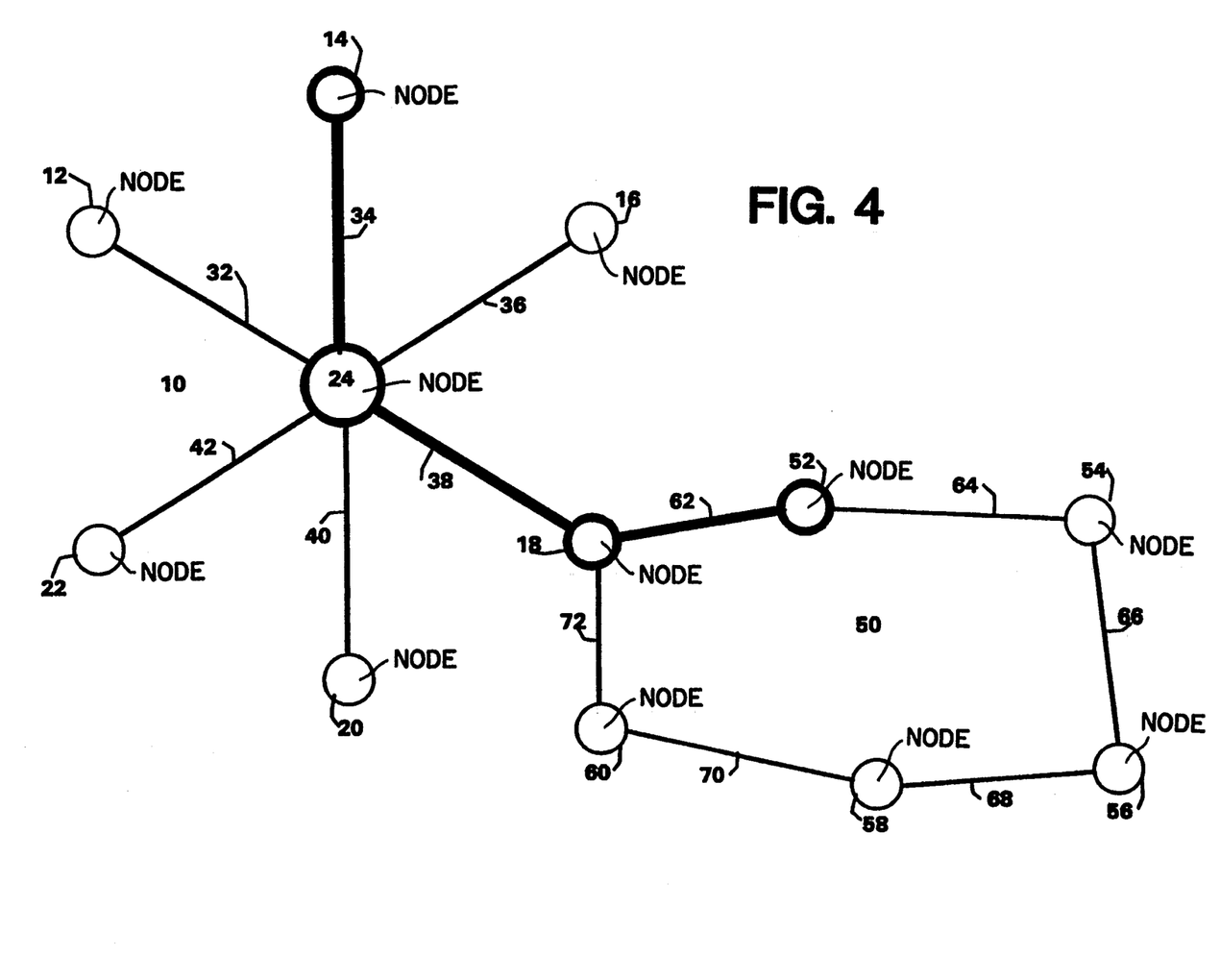
FIG. 4 is a block diagram of an exemplary packet-switched network with an exemplary data path.
Figure 5:
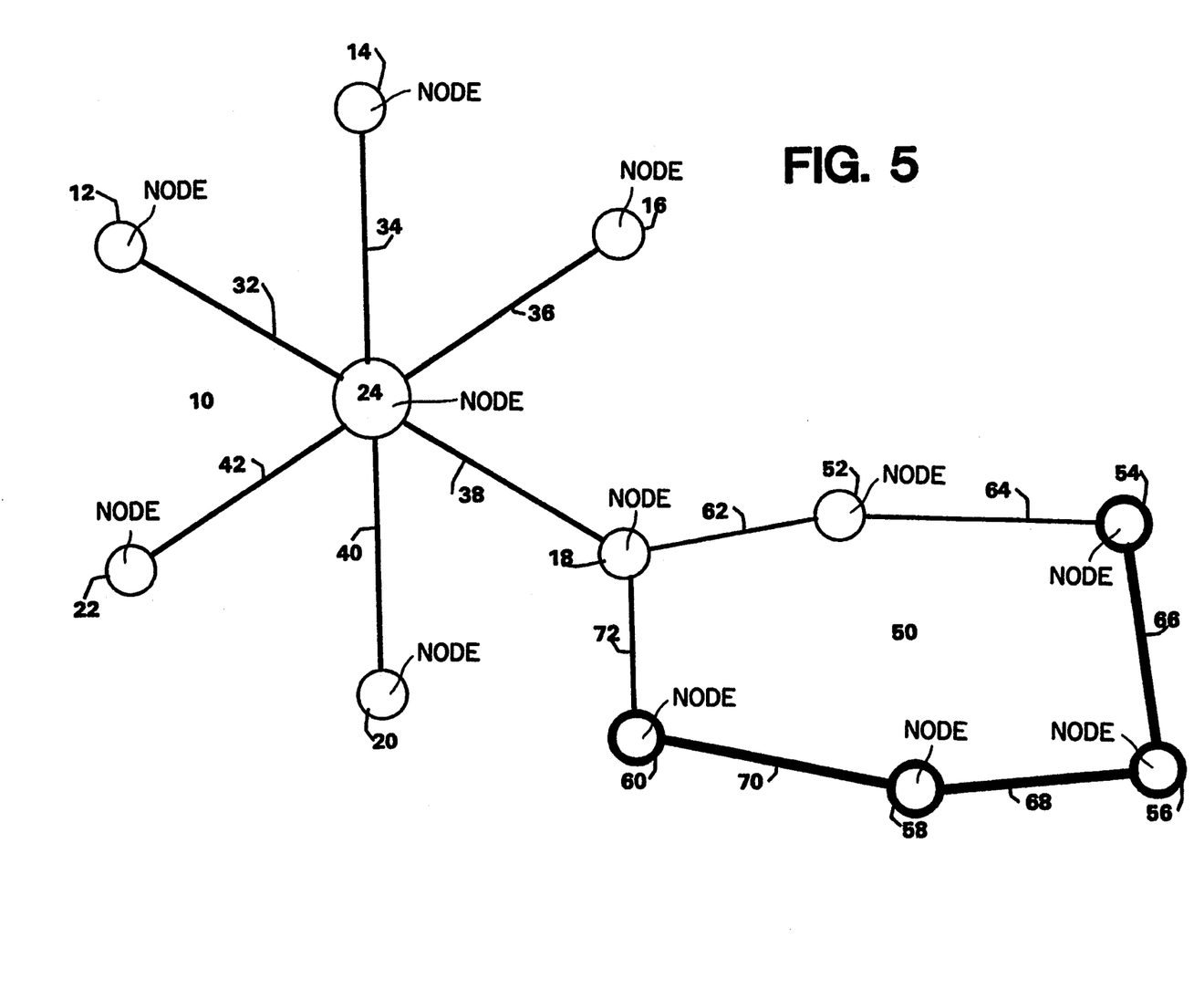
FIG. 5 is a block diagram of the exemplary packet-switched network shown in FIG. 4 with another exemplary data path.
Figure 6:
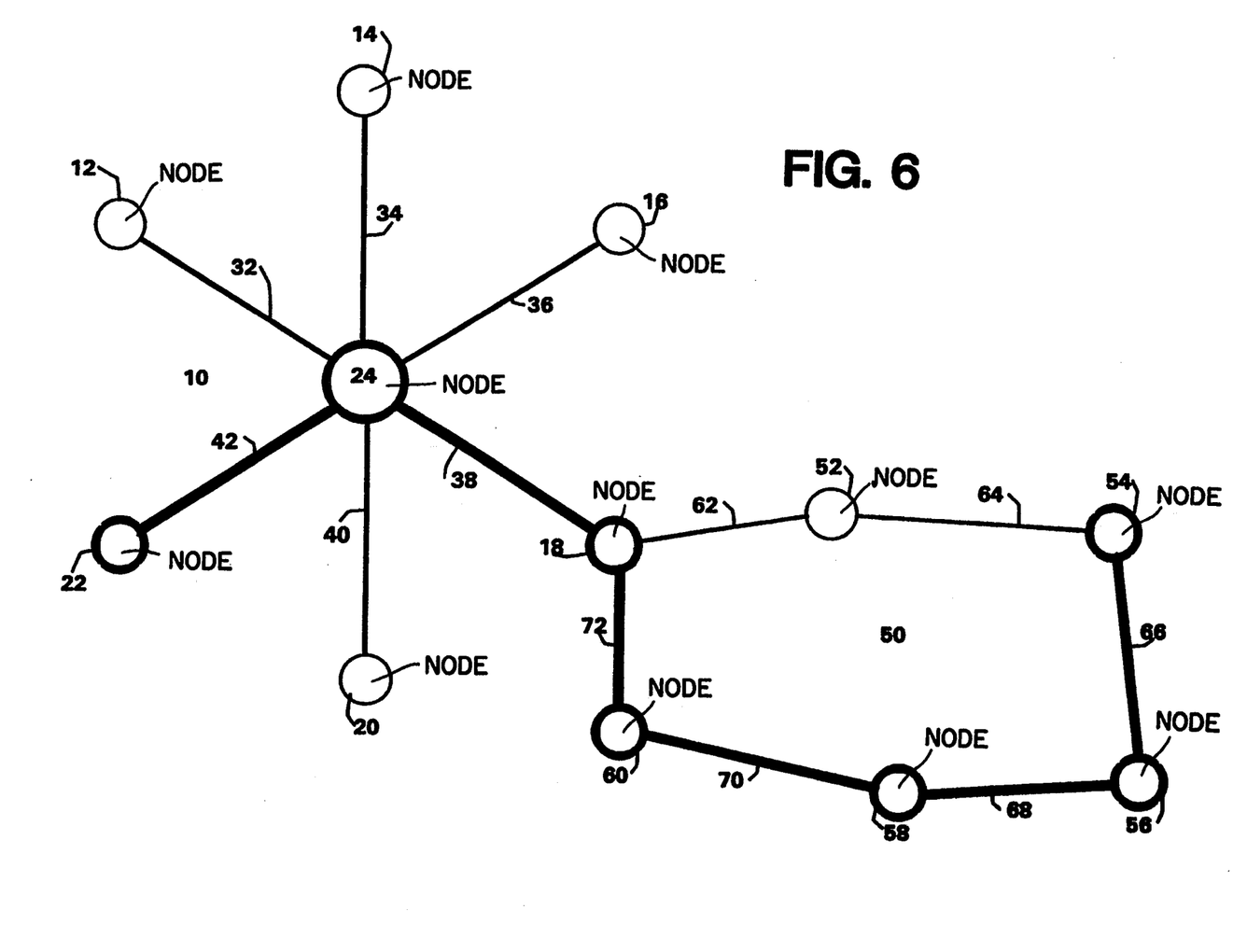
FIG. 6 is a block diagram of the exemplary packet-switched network shown in FIGS. 4 and 5 with a third exemplary data path.

FIGS. 4 to 6 represent some examples of different possible data paths that the system and method of this invention could be used to reserve bandwidth. FIGS. 4 to 6 are each comprised of a star network 10 and a ring network 50 interconnected at Node 18. The different exemplary paths in FIGS. 4 to 6 are denoted by the bold lines for the nodes and links of the data path as compared to the other nodes and links in the Figures.

In FIG. 4, the data path is between nodes 14 and 52 which are connected by links 34, 38, and 62. In this example, node 14 is equivalent to Node 0 as shown in FIG. 1, node 24 to Node 1, node 18 to Node 2, and node 52 to Node 3. Node 14 is the source node sending data to node 52, the destination node. Thus the exemplary data path shown in FIG. 1 may be between two different type of networks, in the example shown in FIG. 4, between a star topology network and a ring topology network.

In FIG. 5, the data path is between nodes 54 and 60 which are connected by links 66, 68, and 70. In this example, node 54 is equivalent to Node 0 as shown in FIG. 1, node 56 to Node 1, node 58 to Node 2, and node 60 to Node 3. Node 54 is the source node sending data to node 60, the destination node. Thus the exemplary data path shown in FIG. 1 may also be confined to one type of network, in the example shown in FIG. 5, a ring topology network.

This example also illustrates the advantage of sending the request packet back to the source node after a link which can not support at least B_min is encountered in the forward path. In this example, if the source node receives a request reply packet which indicates that at least B_min could not be allocated, it may attempt to reserve the bandwidth on another path to the destination node 60, for example the path through links 64, 62, and 72 to the destination node 60.

In FIG. 6, the data path is between nodes 22 and 54 which are connected by links 42, 38, 72, 70, 68, and 66. This example is provided to shown that the data path may be between any number of nodes and links and is not limited to three links and four nodes as shown in FIG. 1.

Figure 7:
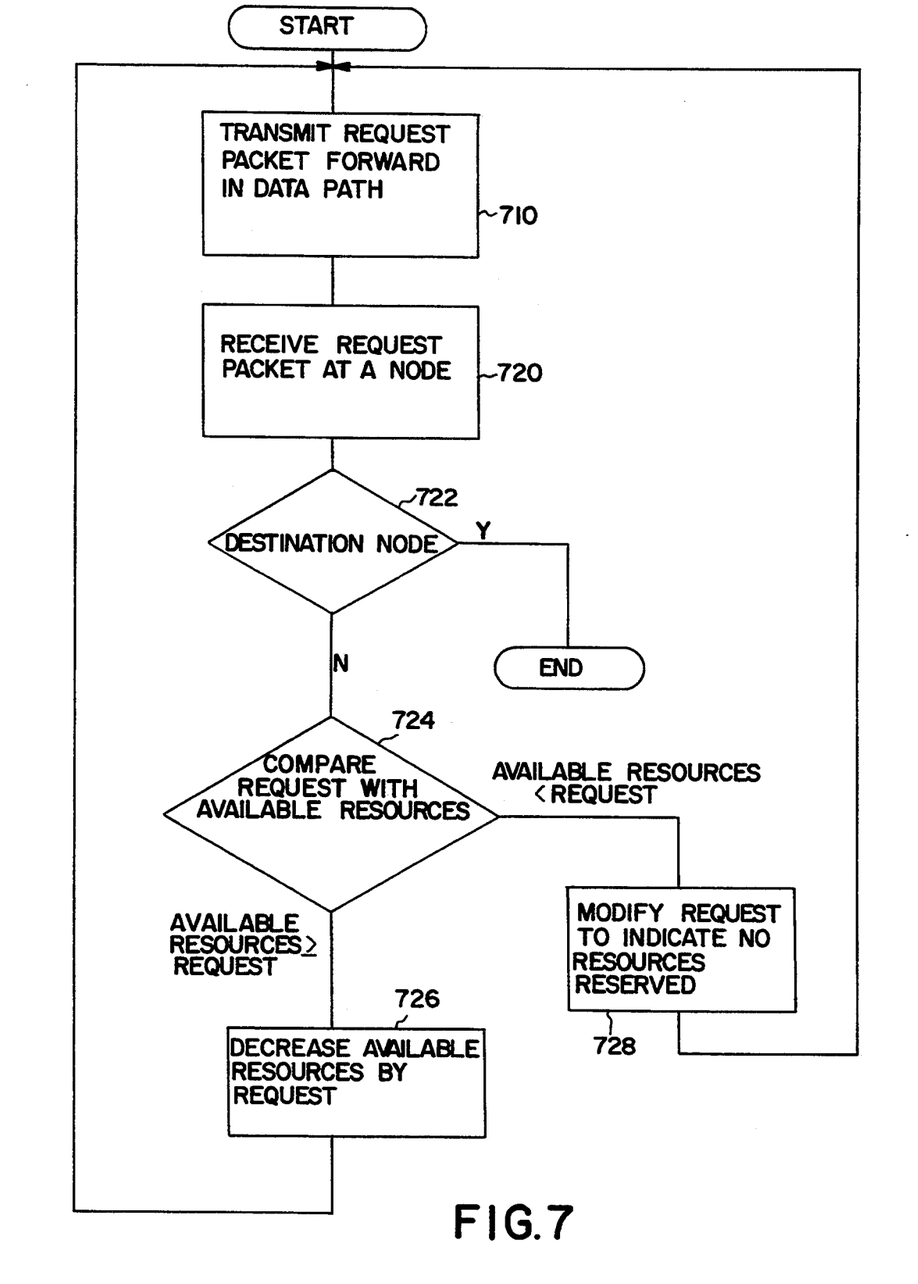
FIG. 7 shows a flow chart illustrating the steps of an exemplary embodiment of the present invention.

FIG. 7 shows a flow chart illustrating the steps of an exemplary embodiment of the present invention. As seen, at step 710, a request packet is transmitted forward in the datapath. At step 720, the request packet is received by a node. It is determined, at step 722, if the node is the destination node: if it is, this procedures ends; if it is not, the procedure continues to step 724. At step 724, the request of the packet is compared with the available resources. If the available resources are greater or equal to the request, the available resources are decreased by the request amount, step 726, and the process goes back to step 710. If the available resources are less than the request, the packet is modified to indicate no resources were reserved, step 728, then the process goes back to step 710. As described herein, alternate steps may be taken to transmit the packet backwards at step 728 or to provide for a minimum and maximum request.

Although the invention has been described in terms of an exemplary embodiment, it is contemplated that it may be practiced as outlined above within the spirit and scope of the appended claims.

What is claimed:

1. A method of requesting resources in a communications network with minimal latency, said method comprising the steps of:
   (a) transmitting a request packet in a path from a source node through at least one intermediate node towards a destination node, said nodes coupled by respective links and said request packet containing a request for resources to complete a requested transmission along the path to the destination node; and
   (b) comparing the request for resources in the request packet to the available resources of a selected link in the path and (1) decreasing the available resources of the selected link by the request for resources in the request packet and sending the request packet forward in the path when the available resources of the selected link is at least equal to the request for resources and (2) modifying the request packet to form a modified request packet indicating that no resources are to be reserved for the request packet when the available resources of the selected link is less than the request for resources and sending the modified request packet forward in the path.

2. A method of requesting resources in a communications network with minimal latency, said method comprising the steps of:
   (a) transmitting a request packet forward in a path from a source node through at least one intermediate node towards a destination node and backwards in the path, said nodes coupled by respective links and said request packet containing a request for resources to complete a requested transmission along the path to the destination node; and
   (b) comparing the request for resources in the request packet sent forward in the path to the available resources of a selected link in the path and (1) decreasing the available resources of the selected link by the request for resources in the request packet and sending the request packet forward in the path when the available resources of the selected link is at least equal to the request for resources and (2) modifying the request for resources in the request packet to zero to form a modified equest packet and sending the modified request packet backward in the path when the available resources of the selected link is less than the request for resources.

3. A method according to claim 2 further comprising the step of:
   increasing the available resources of a selected link by the difference between the request for resources in the request packet sent backwards in the path and amount of resources reserved for this request packet.

4. A method of requesting resources in a communications network with minimal latency, said method comprising the steps of:
   (a) transmitting a request packet forward in a path from a source node through at least one intermediate node towards a destination node and backwards in the path, said nodes coupled by respective links and said request packet containing a request for resources to complete a requested transmission along the path to the destination node;
   (b) comparing the request for resources in the request packet sent forward in the path to the available resources of a selected link in the path and (1) decreasing the available resources of the selected link by the request for resources in the request packet and sending the request packet forward in the path when the available resources of the selected link is at least equal to the request for resources and (2) modifying the request for resources in the request packet to zero to form a modified request packet and sending the modified request packet backward in the path when the available resources of the selected link is less than the request for resources; and
   (c) increasing the available resources of a selected link by the difference between the request for resources in the modified request packet sent backwards in the path and amount of resources previously reserved for this request packet.

5. A method of requesting resources in a communications network with minimal latency, said method comprising the steps of:
   (a) transmitting a request packet in a path from a source node through at least one intermediate node towards a destination node, said nodes coupled by respective links and said request packet containing a minimum request for resources and a desired request for resources to complete a requested transmission along the path to the destination node where the desired request for resources is greater than or equal to the minimum request for resources; and
   (b) comparing the request for resources in the request packet to the available resources of a selected link in the path and (1) decreasing the available resources of the selected link by the desired request for resources in the request packet and sending the request packet forward in the path when the available resources of the selected link is at least equal to the desired request for resources, (2) decreasing the available resources of the selected link by the available resources of the selected link, modifying the desired request for resources in the request packet to the available resources of the selected link to form a modified request packet and sending the modified request packet forward in the path when the available resources of the selected link is at least equal to the minimum request for resources and less than the desired request for resources, and (3) modifying the request packet to form a modified request packet indicating that no resources are to be reserved for the request packet when the available resources of the selected link is less than the minimum request for resources and sending the modified request packet forward in the path.

6. A method of requesting resources in a communications network with minimal latency, said method comprising the steps of:
   (a) transmitting a request packet forward in a path from a source node through at least one intermediate node towards a destination node and backwards in the path, said nodes coupled by respective links and said request packet containing a minimum request for resources and a desired request for resources to complete a requested transmission along the path to the destination node where the desired request for resources is greater than or equal to the minimum request for resources; and
   (b) comparing the request for resources in the request packet sent forward in the path to the available resources of a selected link in the path and (1) decreasing the available resources of the selected link by the desired request for resources in the request packet and sending the request packet forward in the path when the available resources of the selected link is at least equal to the desired request for resources, (2) decreasing the available resources of the selected link by the available resources of the selected link, modifying the desired request for resources in the request packet to the available resources of the selected link to form a modified request packet and sending the modified request packet forward in the path when the available resources of the selected link is at least equal to the minimum request for resources and less than the desired request for resources, and (3) modifying the desired request for resources in the request packet to zero to form a modified request packet and sending the modified request packet backward in the path when the available resources of the selected link is less than the minimum request for resources.

7. A method according to claim 6 further comprising the step of:

increasing the available resources of a selected link by the difference between the desired request for resources in the request packet sent backwards in the path and amount of resources reserved for this request packet.

8. A method of requesting resources in a communications network with minimal latency, said method comprising the steps of:

(a) transmitting a request packet forward in a path from a source node through at least one intermediate node towards a destination node and backwards in the path, said nodes coupled by respective links and said request packet containing a minimum request for resources and a desired request for resources to complete a requested transmission along the path to the destination node where the desired request for resources is greater than or equal to the minimum request for resources;

(b) comparing the request for resources in the request packet to the available resources of a selected link in the path and (1) decreasing the available resources of the selected link by the desired request for resources in the request packet and sending the request packet forward in the path when the available resources of the selected link is at least equal to the desired request for resources, (2) decreasing the available resources of the selected link by the available resources of the selected link, modifying the desired request for resources in the request packet to the available resources of the selected link to form a modified request packet and sending the modified request packet forward in the path when the available resources of the selected link is at least equal to the minimum request for resources and less than the desired request for resources, and (3) modifying the desired request for resources in the request packet to zero to form a modified request packet when the available resources of the selected link is less than the minimum request for resources; and (c) increasing the available resources of a selected link by the difference between the desired request for resources in the modified request packet sent backwards in the path and amount of resources reserved for this request packet.

9. A system for requesting resources in a communications network with minimal latency having a path from a source node through at least one intermediate node towards a destination node, said nodes coupled by respective links and said request packet containing a request for resources to complete a requested transmission along the path to the destination node, said system comprising:

means for transmitting a request packet in the path; and means for comparing the request for resources in the request packet to the available resources of a selected link in the path and (1) decreasing the available resources of the selected link by the request for resources in the request packet and sending the request packet forward in the path when the available resources of the selected link is at least equal to the request for resources and (2) modifying the request packet to form a modified request packet indicating that no resources are to be reserved for the request packet when the available resources of the selected link is less than the request for resources and sending the modified request packet forward in the path.

10. A system for requesting resources in a communications network with minimal latency having a path from a source node through at least one intermediate node towards a destination node, said nodes coupled by respective links and said request packet containing a minimum request for resources and a desired request for resources to complete a requested transmission along the path to the destination node where the desired request for resources is greater than or equal to the minimum request for resources, said system comprising:

means for transmitting a request packet in the path; and means for comparing the request for resources in the request packet to the available resources of a selected link in the path and (1) decreasing the available resources of the selected link by the desired request for resources in the request packet and sending the request packet forward in the path when the available resources of the selected link is at least equal to the desired request for resources, (2) decreasing the available resources of the selected link by the available resources of the selected link, modifying the desired request for resources in the request packet to the available resources of the selected link to form a modified request packet and sending the modified request packet forward in the path when the available resources of the selected link is at least equal to the minimum request for resources and less than the desired request for resources, and (3) modifying the request packet to indicate that no resources are to be reserved for the request packet when the available resources of the selected link is less than the minimum request for resources to form a modified request packet and sending the modified request packet forward in the path.

11. A method of requesting resources in a communications network with minimal latency, said method comprising the steps of:

(a) transmitting a request packet forward in a path from a source node through at least one intermediate node towards a destination node and backwards in the path, said nodes coupled by respective links and said request packet containing a request for resources to complete a requested transmission along the path to the destination node; and (b) comparing the request for resources in the request packet sent forward in the path to the available resources of a selected link in the path and (1) decreasing the available resources of the selected link by the request for resources in the request packet and sending the request packet forward in the path when the available resources of the selected link is at least equal to the request for resources, (2) modifying the request packet to form a modified request packet indicating that no resources are to be reserved for the request packet when the available resources of the selected link is less than the request for resources and (3) sending the modified request packet backward in the path when a predetermined link detects that the request packet indicates that no resources are to be reserved.

* * * * *

UNITED STATES PATENT AND TRADEMARK OFFICE
CERTIFICATE OF CORRECTION

PATENT NO.  : 5,367,517
DATED       : November 22, 1994
INVENTOR(S) : Cidon et al.

Page 1 of 2

It is certified that error appears in the above-identified patent and that said Letters Patent is hereby corrected as shown below:

On the title page, item

[56]     References Cited

U.S. PATENT DOCUMENTS 5,081,620     1/1991     Girard et al................ 370/60

OTHER PUBLICATIONS

"Network Transparency: The PLANET Approach", Gopal et al., IEEE INFOCOM '92 The Conference on Computer Communications (May 6-8, 1992)

"The Fast Reservation Protocol", Tranchier, 1st IEEE Broadband ISDN Technical Workshop, March 19-21, 1991

"A Congestion Control for the ATM", Boyer, 7th ITC Seminar, Oct. 1990

UNITED STATES PATENT AND TRADEMARK OFFICE
CERTIFICATE OF CORRECTION

PATENT NO. : 5,367,517
DATED : November 22, 1994
INVENTOR(S) : Cidon, et al

It is certified that error appears in the above-indentified patent and that said Letters Patent is hereby corrected as shown below:

"Traffic Control in the B-ISDN", Roberts, Special Issue on ITC Seminar, March 1992.

Signed and Sealed this

Fourth Day of April, 1995

*Attest:*

BRUCE LEHMAN

*Attesting Officer*     Commissioner of Patents and Trademarks